Jan. 16, 1962 W. R. WOLFE, JR 3,017,335
ELECTROLYTIC PRODUCTION OF FLUOROCARBONS AND METALLIC SODIUM
Filed Feb. 25, 1958
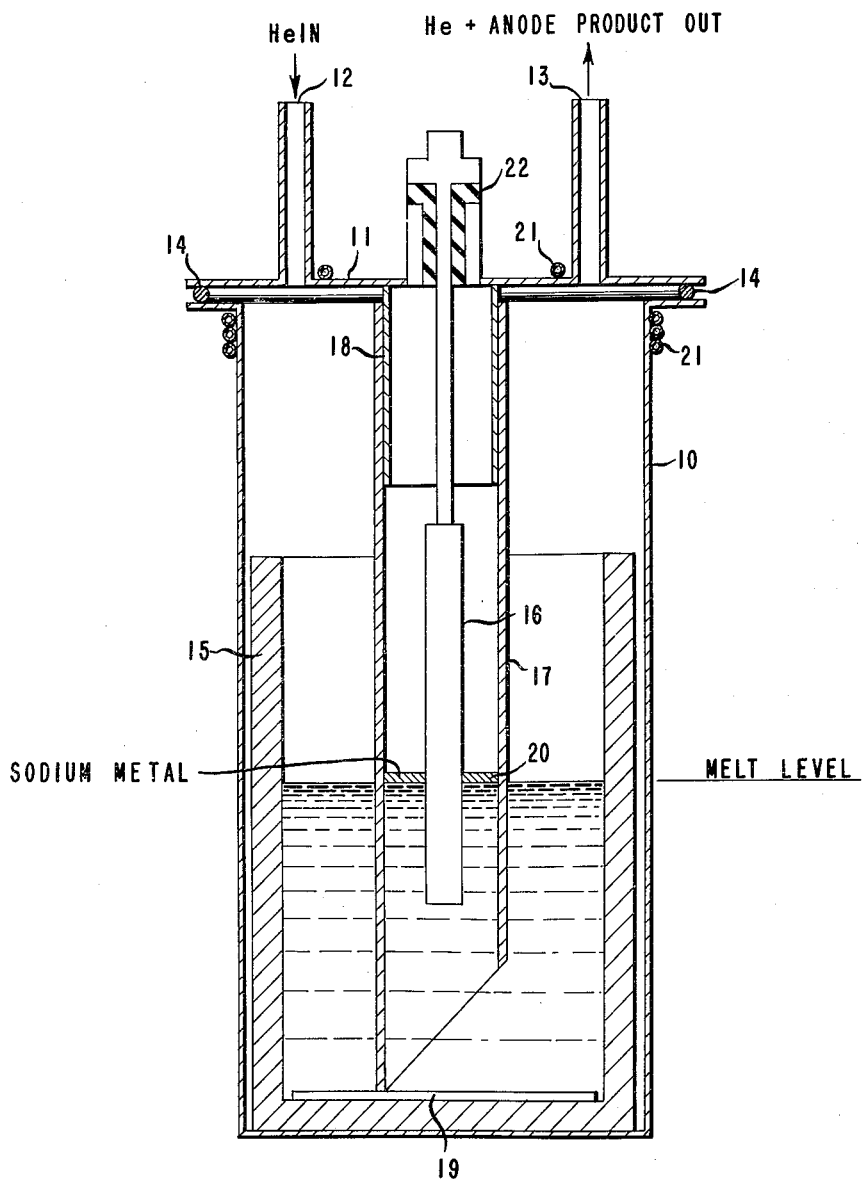
INVENTOR
WILLIAM R. WOLFE, JR
BY James H. Ryan
ATTORNEY United States Patent Office 3,017,335
Patented Jan. 16, 1962

3,017,335
ELECTROLYTIC PRODUCTION OF FLUOROCARBONS AND METALLIC SODIUM
William R. Wolfe, Jr., Wilmington, Del., assignor to E. I. du Pont de Nemours and Company, Wilmington, Del., a corporation of Delaware
Filed Feb. 25, 1958, Ser. No. 717,429
10 Claims. (Cl. 204—62)

This invention relates to a new process for preparing fluorocarbons and sodium metal. More particularly it relates to a method for preparing low molecular weight saturated fluorocarbons and sodium metal of high purity by electrolysis of a low melting mixture of metal fluorides containing sodium fluoride.

Saturated fluorocarbons are employed in a variety of uses, for example, as refrigerants, dielectric materials, propellants in aerosols, and as chemical intermediates. Metallic sodium also has many uses which are well known in the art such as its applications in the preparation of organic chemicals where a powerful reducing agent is required and in the manufacture of such important materials of commerce as sodium peroxide, sodium cyanide, and tetraethyllead. Because of these varied and ever increasing applications, new and more economical syntheses of saturated fluorocarbons and sodium are highly desirable. Syntheses of fluorocarbons which do not require the use of elemental fluorine or of hydrogen fluoride are particularly favorable.

Methods for the preparation of various fluorocarbons involving the electrolysis of inorganic fluorides with a carbon anode are known. Similarly, processes involving the electrolytic separation of sodium from its compounds have been described. However, no method has heretofore been proposed which produces both fluorocarbons and metallic sodium simultaneously and with high current efficiencies.

This invention is a process for preparing fluorocarbons and metallic sodium which comprises electrolyzing with a carbon-containing anode, a molten mixture comprising essentially, by weight, 40–70% sodium fluoride, 20–40% calcium fluoride, and 10–30% magnesium fluoride at an electrolyte temperature below about 900° C. and in the substantial absence of combined oxygen.

The lower limit of temperature at which the process may be successfully carried out is that at which electrolysis becomes inefficient due to the separation of solids from the molten electrolyte. In practice, temperatures between 750° and 900° C. are usually employed, while temperatures in the range of 755–850° C. are preferred. At these temperatures, not only is the heat input required lower than at higher temperatures but more readily available materials of construction may be used in the electrolytic cell. The vapor pressures of the electrolyte and sodium are reduced also thus simplifying operation. Temperatures above about 900° C. are undesirable because of the lower current efficiency resulting from increased solubility of metallic sodium in the electrolyte.

The relative proportions of sodium fluoride, calcium fluoride, and magnesium fluoride used in the electrolyte may be varied within certain limits. The eutectic mixture which contains these fluorides in proportion of about 50:30:20 wt. percent represents a preferred composition because of its relatively low melting point. However, other compositions, particularly those in the neighborhood of the eutectic mixture, exhibit melting points in an operable range and may be used if desired. Suitable electrolytes are those containing 40–70% NaF, 20–40% CaF$_2$ and 10–30% MgF$_2$ by weight, the percentages being so chosen as to total at least 95%. Minor amounts, up to about 5%, of other metal fluorides such as LiF, BaF$_2$ and SrF$_2$ may also be present without materially affecting the purity of the sodium produced at the cathode. It will be noted that the proportions of sodium fluoride and magnesium fluoride employed should be such that the weight ratio (NaF/MgF$_2$) is not less than 1. The electrolyte is of course used in a substantially anhydrous state.

The presence of metal oxides, especially alkali or alkaline earth metal oxides, in the electrolyte is particularly detrimental because such impurities cause the sodium to be produced in the form of minute droplets which remain suspended in the electrolyte. Recovery of sodium from such dispersions is extremely difficult and the dispersed metal cannot be confined but eventually diffuses to the anode where it reacts with the anode products reducing the efficiency of the electrolysis.

Contact of the carbon anode and of the sodium produced at the cathode with atmospheric oxygen is undesirable because of resulting oxidation. Such contact can be avoided by operating at reduced pressure or in an atmosphere of inert essentially noncondensable gas or by a combination of these methods. By inert noncondensable gas is meant a gas such as argon, helium or nitrogen which condenses at a temperature appreciably below the boiling point of the fluorocarbons produced and is therefore readily separable from them. The passage of a slow stream of such a gas over the surface of the electrolyte also facilitates the removal of the gaseous reaction products. It is also possible to arrange the electrolysis equipment so that the fluorocarbons produced at the anode prevent the access of atmospheric oxygen thereto. Since this method of operating avoids the use of other gases, it represents a preferred embodiment of the invention.

The electrolysis is normally carried out at substantially atmospheric pressure. However, if desired pressures below atmospheric, e.g., of the order of 300–700 mm. of mercury can be employed. It is also possible to operate at superatmospheric pressures in suitably designed equipment.

The current employed in carrying out the electrolysis depends upon a number of factors, including cell design electrode configuration, composition of the electrolyte, nature of carbon-containing anode and temperature. An upper limit to anode current density is provided by the so-called "anode effect," i.e., the point at which the current drops to a low value and the cell voltage approaches the source voltage. In practice, anode current densities between about 1 and about 45 amperes per square decimeter have been employed. However, much higher values can be used in properly designed equipment. At anode current densities below about 1 ampere per square decimeter, electrolysis does not proceed satisfactorily. The cathode current density is not critical but may vary over a wide range. In the examples which follow a cathode current density varying between about 50 and 150 amperes per square decimeter is employed. However, higher or lower cathode current densities can be used, e.g., current densities of 25 to 200 amperes per square decimeter. The preferred cathode current density is between 50 and 150 amperes per square decimeter.

The voltage at which the electrolysis is carried out must be sufficient to electrolytically decompose the dissolved NaF and at the same time insufficient to cause the anode effect. Due regard must also be paid to the physical dimensions and internal resistance of the cell. With the type of cell described hereinafter, I have found that a cell voltage ranging up to 30 volts is satisfactory.

Sodium fluoride, calcium fluoride and magnesium fluoride of the usual commercial purity are satisfactory for use in preparing the electrolyte of this invention. As noted earlier, it is necessary that the metal fluorides be substantially free of metal oxides.

The particular design of the electrolysis equipment employed is not material. A convenient type of equipment is, however, shown in the appended drawing. It consists of a stainless steel cylindrical vessel 10 equipped with a stainless steel lid 11 having openings 12 and 13 for the introduction and removal of gas. The joint between the lid and the vessel is rendered gas-tight by means of a gasket 14 of inert material such as rubber, neoprene or the like. The vessel contains a graphite crucible 15 which serves as the anode. Supported from the lid is a nickel cathode 16 surrounded by an impervious tube 17 of aluminum oxide open at the bottom. The aluminum oxide tube is attached to the lid by means of a gasketing material (not shown) to provide a substantially gas-tight seal and may be held on a stainless steel support 18 integral with lid 11. Alternatively, a stream of inert gas can be passed through the cell to sweep out the anode product and prevent its reaction with the sodium metal 20 which floats on the electrolyte in the upper part of the aluminum oxide tube. The bottom of the graphite crucible anode is covered with a plate of impervious aluminum oxide 19 to prevent formation of anode products in this area and their subsequent release into the cathode compartment. It is desirable that the upper portions of the electrolysis vessel and the lid be cooled. This may be conveniently accomplished by wrapping these parts with copper tubing 21 through which cooling water can be circulated. Electrical insulation, e.g., 22, and contacts (not shown) will of course be provided as needed.

Other types of electrolytic equipment may be employed. It is essential that contact between the anode products and the cathode product be prevented and that provision be made for replacing the anode as it is consumed such as by periodic renewal or by gradual introduction of fresh anode material. Provision for collecting the products should also be made. The electrolysis can be carried out readily as a continuous operation employing a consumable anode type of equipment provided the above requirements are met.

In the examples below a slow stream of inert gas such as nitrogen, helium or argon is passed over the surface of the electrolyte and serves to remove anode products. After leaving the electrolysis cell, the gas passes through a series of traps cooled with liquid nitrogen which remove the fluorocarbons produced. The exit gas is then vented or may be recycled if desired.

The electrolysis temperature is conveniently determined by a platinum, platinum-rhodium thermocouple surrounded by an impervious alumina sheath and immersed in the electrolyte.

The electrolyte may be prepared directly in the electrolysis cell by melting together sodium fluoride, calcium fluoride and magnesium fluoride in the proper proportions. However, it is convenient to prepare the electrolyte in advance by melting the ingredients together in an atmosphere of nitrogen, cooling and grinding the solidified melt. That portion of ground material which passes a 12-mesh screen is most convenient for use as electrolyte.

In carrying out an electrolysis, the cell is charged with the ground electrolyte, the lid attached and connections made to a source of inert gas and to the traps used for collection of products. The whole apparatus is evacuated to a pressure of approximately 0.1 mm. of mercury and this pressure is maintained while the electrolysis cell is heated to melt the electrolyte. After melting has been completed, the cell and associated equipment are filled with purified helium and the flow of helium adjusted so that a slow stream passes through the cell and thence through the traps. It is desirable to maintain a helium pressure slightly in excess of atmospheric pressure. This may be accomplished by bubbling the exit gas from the traps through a small head of diethyl phthalate or other convenient liquid. The helium employed in the electrolyses described below was purified before use by passing it over activated carbon cooled to the boiling point of liquid nitrogen.

When the desired electrolyte temperature has been reached and the flow of inert gas adjusted, direct current is applied to the electrodes in such a fashion that the carbon electrode becomes the anode. The gaseous products produced at the anode are swept into the traps where they condense while the sodium produced at the cathode collects on the surface of the salt melt inside the aluminum oxide tube surrounding the cathode.

At the completion of the electrolysis, the fluorocarbons condensed in the traps are transferred to stainless steel cylinders for storage. This may be done by distillation or any other convenient means. The sodium is recovered by opening the cell, removing the cathode compartment containing a lower layer of solidified electrolyte and an upper layer of sodium, and separating the sodium from the salt. This may be done conveniently by contacting the mixture with boiling xylene or another inert liquid having a boiling point somewhat higher than the melting point of sodium metal. Alternatively, the electrolysis cell may be provided with a tube extending into the cathode compartment through which sodium may be withdrawn from time to time during the electrolysis. The products are weighed and the composition of the fluorocarbon mixture determined by infrared spectroscopy.

The sodium produced by the instant process is quite pure, soluble contaminants, i.e., metallic calcium and magnesium, occurring to the extent of less than 300 parts per million. The composition of the fluorocarbon product is influenced by a number of factors including the nature of the anode, i.e., whether amorphous carbon or graphite as well as the quantity and type of other constituents present, the temperature and the current density. The product usually contains preponderant amounts of tetrafluoromethane and hexafluoroethane, but higher perfluorocarbons up to about $C_8$ are present also. Representative percentage ranges for the various components are as follows: tetrafluoromethane 10–30 mole percent, hexafluoroethane 40–70 mole percent, perfluoropropane 1–10 mole percent, $C_4$–$C_8$ perfluorocarbons 1–6 mole percent. There are also present small amounts (0.1–1.0 mole percent) of perfluoropropene and perfluoroisobutene.

The invention is illustrated in greater detail by the following nonlimiting examples:

*Example 1*

Using the electrolytic cell and the general procedure described above, a mixture containing sodium fluoride, calcium fluoride and magnesium fluoride in the weight ratio of 50:30:20 is electrolyzed at a temperature of 757° C. in an atmosphere of helium at substantially atmospheric pressure and with a direct current voltage of 3.5–11 volts. The electrolysis is carried out at a current intensity of 3 amperes which is equivalent to an anode current density of 2.5 amperes per square decimeter and a cathode current density of 75 amperes per square decimeter. The electrolysis is continued until 12 ampere hours of electricity have been passed through the cell. The gas produced at the anode weighs a total of 7.1 g. which corresponds to an overall current efficiency in the production of fluorocarbons of 61%. The fluorocarbon product is shown by infrared analysis to consist of carbon tetrafluoride (approximately 20 mole percent), hexafluoroethane (approximately 60–65 mole percent), octafluoropropane (about 10 mole percent), and carbon dioxide (5–10 mole percent). The sodium recovered from the cathode compartment is obtained in an amount (6.7 g.) equivalent to a current efficiency of 63%.

*Example 2*

The electrolyte of Example 1 is electrolyzed as described above at a temperature of approximately 800±10° C. The anode current density varies between 12.3 and 20.5 amperes per square decimeter and the cathode current density varies between 83 and 138 amperes per square decimeter. A total of 132,000 coulombs of electricity is passed through the cell. Cell voltage varies between about 18 and 22 volts. Fluorocarbons are produced at a current efficiency of 92% and sodium is produced at a current efficiency of 88%. The fluorocarbon product is shown by infrared analysis to consist of 50–60 mole percent hexafluoroethane, 30–40 mole percent carbon tetrafluoride, and 5–10 percent octafluoropropane. There are also present smaller amounts of $C_4$–$C_6$ fluorocarbons. The sodium is shown by spectrographic analysis to be of high purity.

In short summary, this invention provides a process for the simultaneous preparation of extremely pure sodium and mixed fluorocarbons which comprises electrolyzing at a temperature below about 900° C. in a cell having a carbon anode, a molten oxide-free mixture, consisting essentially by weight of 40–70% sodium fluoride, 20–40% calcium fluoride, and 10–30% magnesium fluoride (all so selected as to total at least 95% and to provide a weight ratio of sodium fluoride to magnesium fluoride of not less than 1.0) and recovering sodium of high purity at the cathode and saturated perfluorocarbons of up to eight carbon atoms at the anode. The raw materials employed are cheap and abundant and the products are obtained directly in purity adequate for many uses. If desirable for particular applications, the fluorocarbon product may be readily separated into its components by known methods, e.g., partial condensation or the like.

Since obvious modifications in my process will be evident to those skilled in the art, I propose to be bound solely by the appended claims.

The embodiments of the invention in which an exclusive property or privilege is claimed are defined as follows:

1. The process of producing metallic sodium which comprises electrolyzing, with an anode made of chemically uncombined carbon and a voltage of less than 30 volts, a molten electrolyte comprising about 40–70% by weight of sodium fluoride, about 20–40% by weight of calcium fluoride, and about 10–30% by weight of magnesium fluoride, the three named metal fluorides constituting at least about 95% by weight of the electrolyte, any remainder thereof consisting essentially of the fluoride of a different metal, the temperature of said molten electrolyte being not above about 900° C. and the anode current density being at least about one ampere per square decimeter.

2. The invention of claim 1 in which the temperature of the molten electrolyte is maintained at about 750–900° C.

3. The process of producing metallic sodium which comprises electrolyzing, with an anode made of chemically uncombined carbon and a voltage of less than 30 volts, a molten electrolyte consisting essentially of about 40–70% by weight of sodium fluoride, about 20–40% by weight of calcium fluoride, and about 10–30% by weight of magnesium fluoride, the temperature of said molten electrolyte being not above about 900° C. and the anode current density being at least about one ampere per square decimeter.

4. The process of producing metallic sodium which comprises electrolyzing, with an anode made of chemically uncombined carbon and a voltage of less than 30 volts, a molten electrolyte consisting essentially of sodium fluoride, calcium fluoride, and magnesium fluoride in the approximate weight ratio of 50:30:20, the temperature of said molten electrolyte being not above about 900° C. and the anode current density being at least about one ampere per square decimeter.

5. The process of producing fluorocarbons from a carbon anode which comprises electrolyzing, with an anode made of chemically uncombined carbon and a voltage of less than 30 volts, a molten electrolyte comprising about 40–70% by weight of sodium fluoride, about 20–40% by weight of calcium fluoride, and about 10–30% by weight of magnesium fluoride, the three named metal fluorides constituting at least about 95% by weight of the electrolyte, any remainder thereof consisting essentially of the fluoride of a different metal, the temperature of said molten electrolyte being not above about 900° C. and the anode current density being at least about one ampere per square decimeter.

6. The invention of claim 5 in which the temperature of the molten electrolyte is maintained at about 750–900° C.

7. The invention of claim 5 in which the electrolyte comprises about 40–70% by weight of sodium fluoride, about 20–40% by weight of calcium fluoride, and about 10–30% by weight of magnesium fluoride.

8. The invention of claim 5 in which the sodium fluoride:calcium fluoride:magnesium fluoride weight ratio is about 50:30:20.

9. The process of simultaneously producing fluorocarbons from a carbon anode and metallic sodium which comprises electrolyzing, with direct current at a voltage of less than 30 volts between an insoluble cathode and an anode made of chemically uncombined carbon, a molten electrolyte comprising about 40–70% by weight of sodium fluoride, about 20–40% by weight of calcium fluoride, and about 10–30% by weight of magnesium fluoride, the three named metal fluorides constituting at least about 95% by weight of the electrolyte, any remainder thereof consisting essentially of the fluoride of a different metal, the temperature of said molten electrolyte being not above about 900° C. and the anode current density being at least about one ampere per square decimeter.

10. The process of claim 9 in which the temperature of the molten electrolyte is maintained at about 750–900° C.

References Cited in the file of this patent

UNITED STATES PATENTS

| | | |
|---|---|---|
| 679,253 | Cowles | July 23, 1901 |
| 785,961 | Lyons et al. | Mar. 28, 1905 |
| 841,724 | Seward et al. | Jan. 22, 1907 |
| 868,670 | Kugelgen et al. | Oct. 22, 1907 |
| 2,592,144 | Howell et al. | Apr. 8, 1952 |
| 2,841,544 | Radimer | July 1, 1958 |